(12) United States Patent
Schabenberger et al.

(10) Patent No.: US 8,271,537 B2
(45) Date of Patent: Sep. 18, 2012

(54) GRID COMPUTING SYSTEM ALONGSIDE A DISTRIBUTED DATABASE ARCHITECTURE

(75) Inventors: Oliver Schabenberger, Cary, NC (US); Steve Krueger, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 120 days.

(21) Appl. No.: 12/946,079

(22) Filed: Nov. 15, 2010

(65) Prior Publication Data

US 2012/0124100 A1    May 17, 2012

(51) Int. Cl.
G06F 17/30 (2006.01)
(52) U.S. Cl. ..................................................... 707/802
(58) Field of Classification Search .................. 707/791, 707/792, 797, 802
See application file for complete search history.

(56) References Cited

U.S. PATENT DOCUMENTS

| | | | |
|---|---|---|---|
| 6,662,174 B2 * | 12/2003 | Shah et al. ............................. | 1/1 |
| 7,080,090 B2 * | 7/2006 | Shah et al. .................... | 707/605 |
| 8,117,606 B2 * | 2/2012 | Chakrabarti et al. ......... | 717/156 |
| 2002/0040639 A1 * | 4/2002 | Duddleson et al. ................ | 92/52 |
| 2004/0122813 A1 * | 6/2004 | Shah et al. ......................... | 707/3 |
| 2006/0129564 A1 * | 6/2006 | Shah et al. ....................... | 707/10 |
| 2007/0078960 A1 | 4/2007 | Dawson et al. | |
| 2007/0100961 A1 | 5/2007 | Moore | |
| 2007/0118839 A1 | 5/2007 | Berstis et al. | |
| 2007/0282794 A1 * | 12/2007 | Barsness et al. ................... | 707/2 |
| 2008/0298240 A1 | 12/2008 | Lee et al. | |
| 2009/0100180 A1 * | 4/2009 | Chidambaran et al. ....... | 709/226 |

FOREIGN PATENT DOCUMENTS

| | | |
|---|---|---|
| WO | 03048961 | 6/2003 |
| WO | 2007064127 A1 | 6/2007 |
| WO | 2009/143073 | 11/2009 |

OTHER PUBLICATIONS

Bekas, C. et al., "Low Cost High Performance Uncertainty Quantification", WHPCF '09, Portland, Oregon, 8 pp.(Nov. 15, 2009).
Hesterberg, Tim et al., "Least Angle Regression", abridged version of an SBIR Phase II proposal to NIH, pp. 1-28 (Apr. 3, 2006).
Islam, Nazrul et al., "An Empirical Distributed Matrix Multiplication Algorithm to Reduce Time Complexity", Proceedings of the International MultiConference of Engineers and Computer Scientists 2009 vol. II, IMEC 2009, Mar. 18-20, 2009, Hong Kong, pp. 2171-2173.
Milasinovic, Goran, Jul. 4, 2011 International Search Report with Written Opinion from PCT/US2011/024540 (10 pp.).
Schabenberger et al., PCT/US2011/059700, filed Nov. 8, 2011, Notification of Transmittal of the International Search Report and the Written Opinion of the International Searching Authority dated Feb. 6, 2012.

* cited by examiner

*Primary Examiner* — Cam-Linh Nguyen
(74) *Attorney, Agent, or Firm* — Jones Day

(57) ABSTRACT

Systems and methods are provided for a grid computing system that performs analytical calculations on data stored in a distributed database system. A grid-enabled software component at a control node is configured to invoke database management software (DBMS) at the control node to cause the DBMS at a plurality of the worker nodes to make available data to the grid-enabled software component local to its node; instruct the grid-enabled software components at the plurality of worker nodes to perform an analytical calculation on the received data and to send the results of the data analysis to the grid-enabled software component at the control node; and assemble the results of the data analysis performed by the grid-enabled software components at the plurality of worker nodes.

36 Claims, 16 Drawing Sheets

GRID COMPUTING SYSTEM ALONGSIDE A DISTRIBUTED DATABASE ARCHITECTURE

TECHNICAL FIELD

The technology described herein relates generally to distributed data processing and more specifically to distributed data processing using grid-based computing systems and distributed database systems.

BACKGROUND

High-performance analytic solutions involve co-locating data and analytic code. This can reduce I/O overhead because large amounts of data can be loaded into memory across a grid of nodes and parallel computing can take place. One technique for the co-location of data and analytic code is referred to as the in-database model. Another technique is referred to as the outside-the-database model.

With the in-database model, analytic code executes on the nodes of a distributed database system in a shared-nothing environment. The process usually commences by calling from a SQL query a user-defined function (UDF) that was pre-installed on the database management system. The data are either already local to the nodes or are moved to the nodes as requested by the SQL query.

The in-database model is a SQL-centric, shared-nothing environment in which UDFs execute under the control of the database management system. That is, nodes cannot communicate with each other, typically information cannot persist between queries on the database nodes unless it is written in the form of tables to the database management system, and the database management system controls resources consumed by the UDF. In this model, failover, replication, and support for transactions can be provided by the database.

With the outside-the-database model, a gridded computing environment is employed where data resides in memory on the compute nodes, and the analytic code, instead of the database management system, controls the entire process. Data is co-located by pre-distributing it to the grid nodes where the analytic code loads the local data into memory.

The outside-the-database model can be a shared-everything environment and could also be called the "without-the-database" model since there is no immediate connection to a distributed database. The data might come from, for example, a Teradata® database, but it is distributed onto the grid compute nodes prior to the analysis, and the connection with the distributed database where the data might have originated is severed. In this environment, the analytic code has full control over node-to-node communication by adding a message passing protocol.

SUMMARY

In accordance with the teachings provided herein, systems and methods are provided for a grid computing system that performs analytical calculations on data stored in a distributed database system. This technique for co-locating data and analytic code, referred to herein as the alongside the database model, allows analytic code to exercise full control of the analytic process and full control of data access but uses a distributed database to feed data to the local compute nodes. It co-locates data, analytic code, and the hardware needed to store the data and execute the analytic code. The analytic code remains in control and allows for node-to-node communication. Data is directly retrieved from a co-located distributed database to load into memory on the grid nodes, which allows for the flexibility to perform the analytics as in the outside-the-database model and utilize the distributed database's capabilities for failover, replication, and transactional safety.

For example, a grid-enabled software component executes on a control node and provides commands to a plurality of worker node grid-enabled software components. Each of the worker node grid-enabled software components are associated with and execute on a separate node. The node also executes database management software (DBMS) that manage data on which analytical calculations or querying or load activity may be performed. The grid-enabled software component at the control node is configured to invoke the DBMS at the control node to cause the DBMS at a plurality of the worker nodes to make available a portion of the data to the grid-enabled software component local to its node; instruct the grid-enabled software components at the plurality of worker nodes to perform an analytical calculation on the received data and to send the results of the data analysis to the grid-enabled software component at the control node; and assemble the results of the data analysis performed by the grid-enabled software components at the plurality of worker nodes.

DETAILED DESCRIPTION

Figure 1:
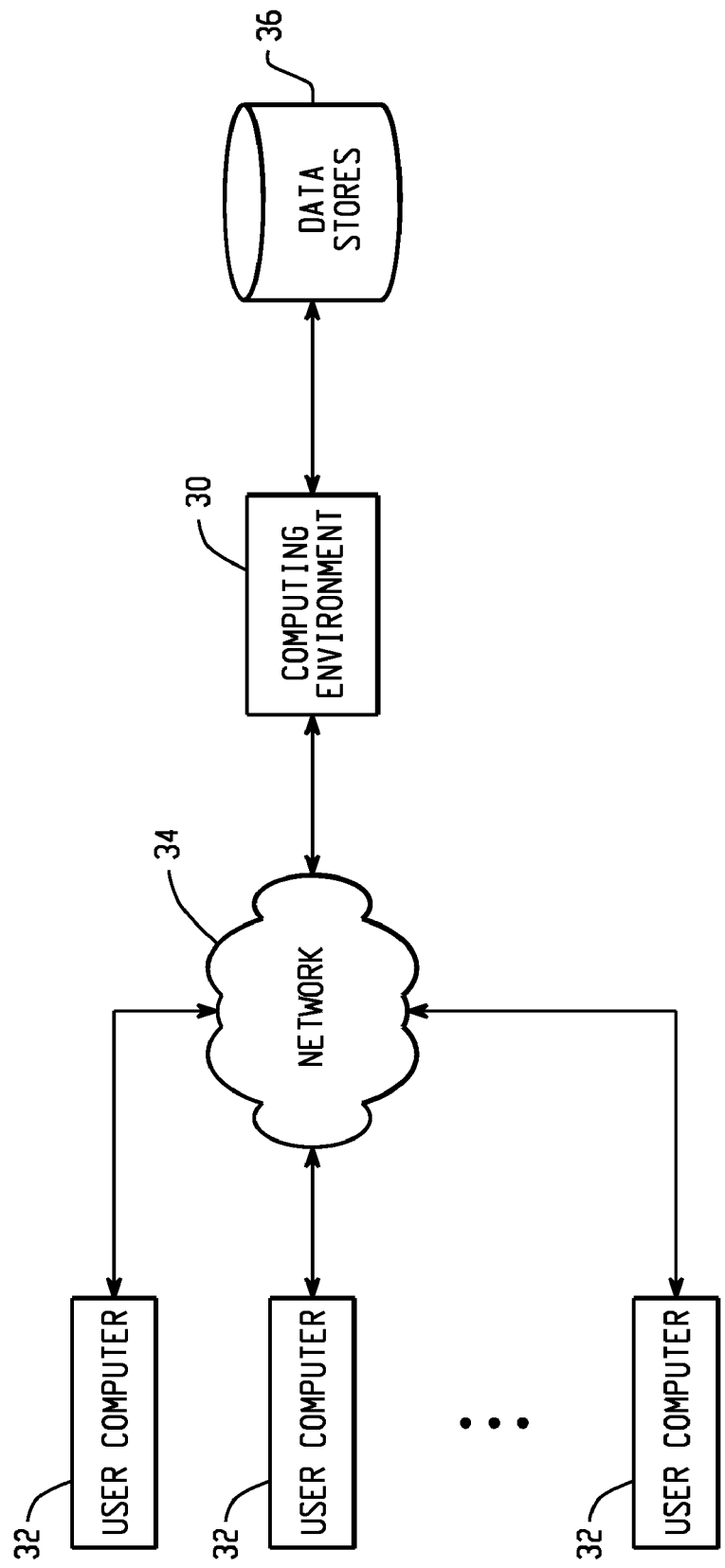
FIG. 1 is a block diagram depicting an environment wherein users can interact with a computing environment.

FIG. 1 depicts at 30 a computing environment for processing large amounts of data for many different types of applications, such as for scientific, technical or business applications that require a great number of computer processing cycles. User computers 32 can interact with the computing environment 30 through a number of ways, such as over a network 34.

One or more data stores 36 are used to store the data to be processed by the computing environment 30 as well as any intermediate or final data generated by the computing system in non-volatile memory. However in certain embodiments, the configuration of the computing environment 30 allows its operations to be performed such that intermediate and final data results can be stored solely in volatile memory (e.g., RAM), without a requirement that intermediate or final data results be stored to non-volatile types of memory (e.g., disk).

This can be useful in certain situations, such as when the computing environment 30 receives ad hoc queries from a user and when responses, which are generated by processing large amounts of data, need to be generated on-the-fly. In this non-limiting situation, the computing environment 30 is configured to retain the processed information within memory so that responses can be generated for the user at different levels of detail as well as allow a user to interactively query against this information.

Figure 2:
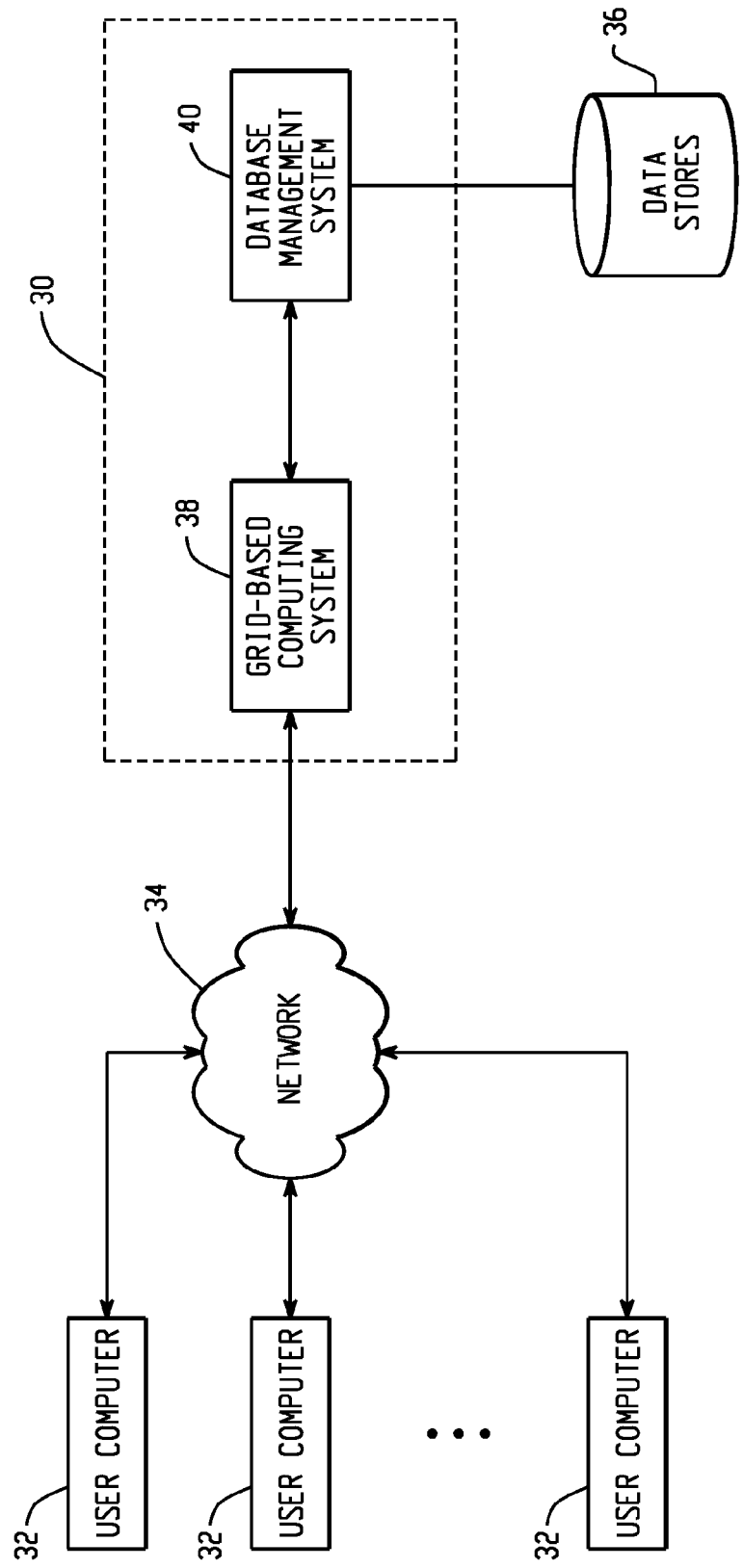
FIG. 2 is a block diagram depicting a computing environment containing a grid-based computing system and a database management system.

FIG. 2 illustrates an example computing environment 30. The example computing environment 30 includes a grid-based computing system 38 for processing large amounts of data and a database management system 40 for managing, storing, and retrieving large amounts of data that are distributed to and stored in the multiple data stores 36 that reside at different locations within a distributed database system. As the hashed lines in FIG. 2 are intended to indicate, the compute nodes in the grid-based computing system 38 and the database management system 40 share the same processor hardware.

Figure 3:
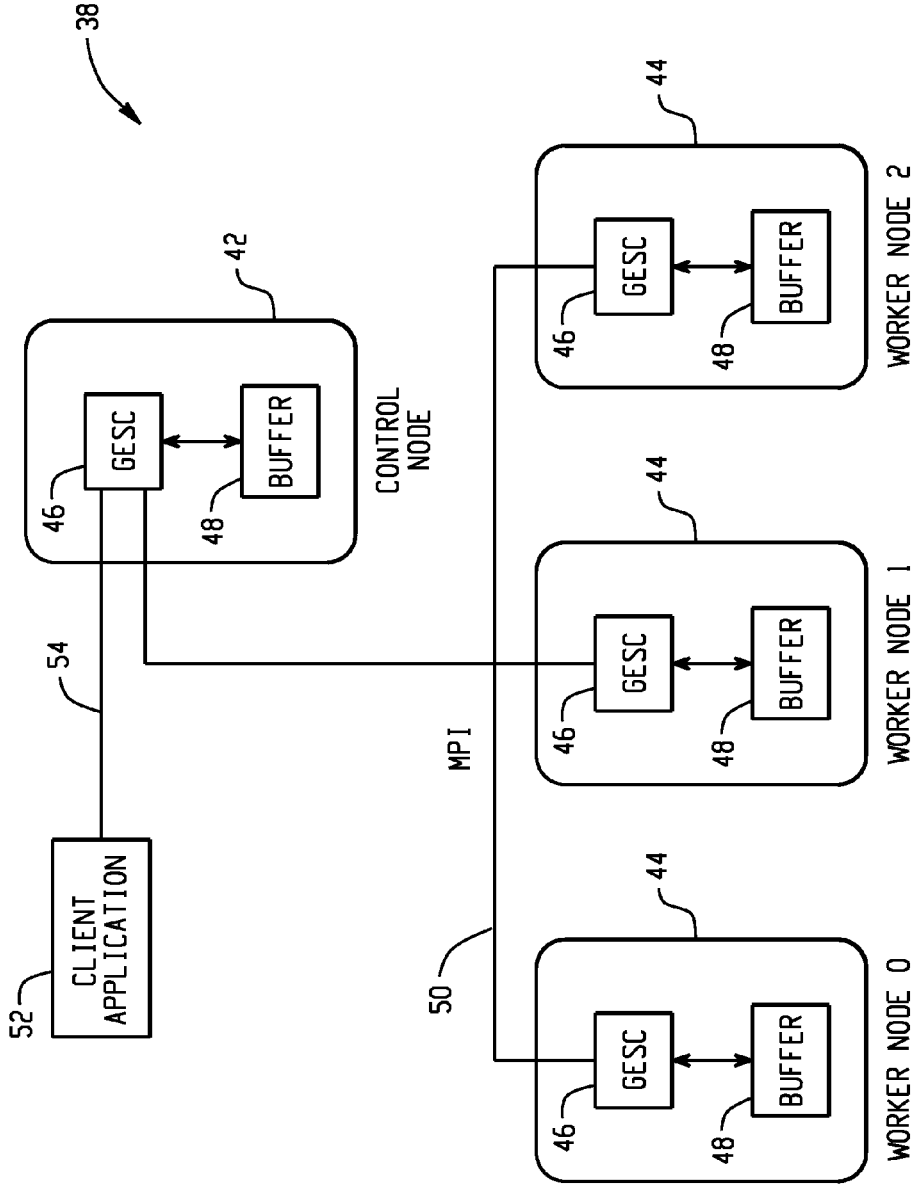
FIG. 3 is a block diagram depicting hardware and software components of a grid-based computing system.

FIG. 3 illustrates hardware and software components for a grid-based computing system 38. The grid-based computing system 38 includes a number of data processing nodes 42, 44 comprising multi-core data processors. One of the nodes is designated a control data processing node 42 and a plurality of the nodes are designated as worker data processing nodes 44. Each data processing node 42, 44 includes a grid-enabled software component (GESC) 46 that executes on the data processor associated with that node and interfaces with buffer memory 48 also associated with that node.

The GESC 46 at the various nodes 42, 44 are connected via a network 50 and can communicate with each other using a predetermined communication protocol such as the Message Passing Interface (MPI). Each GESC 46 can engage in point-to-point communication with the GESC at another node or in collective communication with multiple GESCs via the network 50. The GESC 46 at each node in this example contains identical software instructions and each data processing node is capable of operating as either a control node 42 or a worker node 44. The GESC at the control node 42 can communicate with a client application 52 over a communication path 54 to receive ad hoc queries from a user and to respond to those ad hoc queries after processing large amounts of data.

Figure 4:
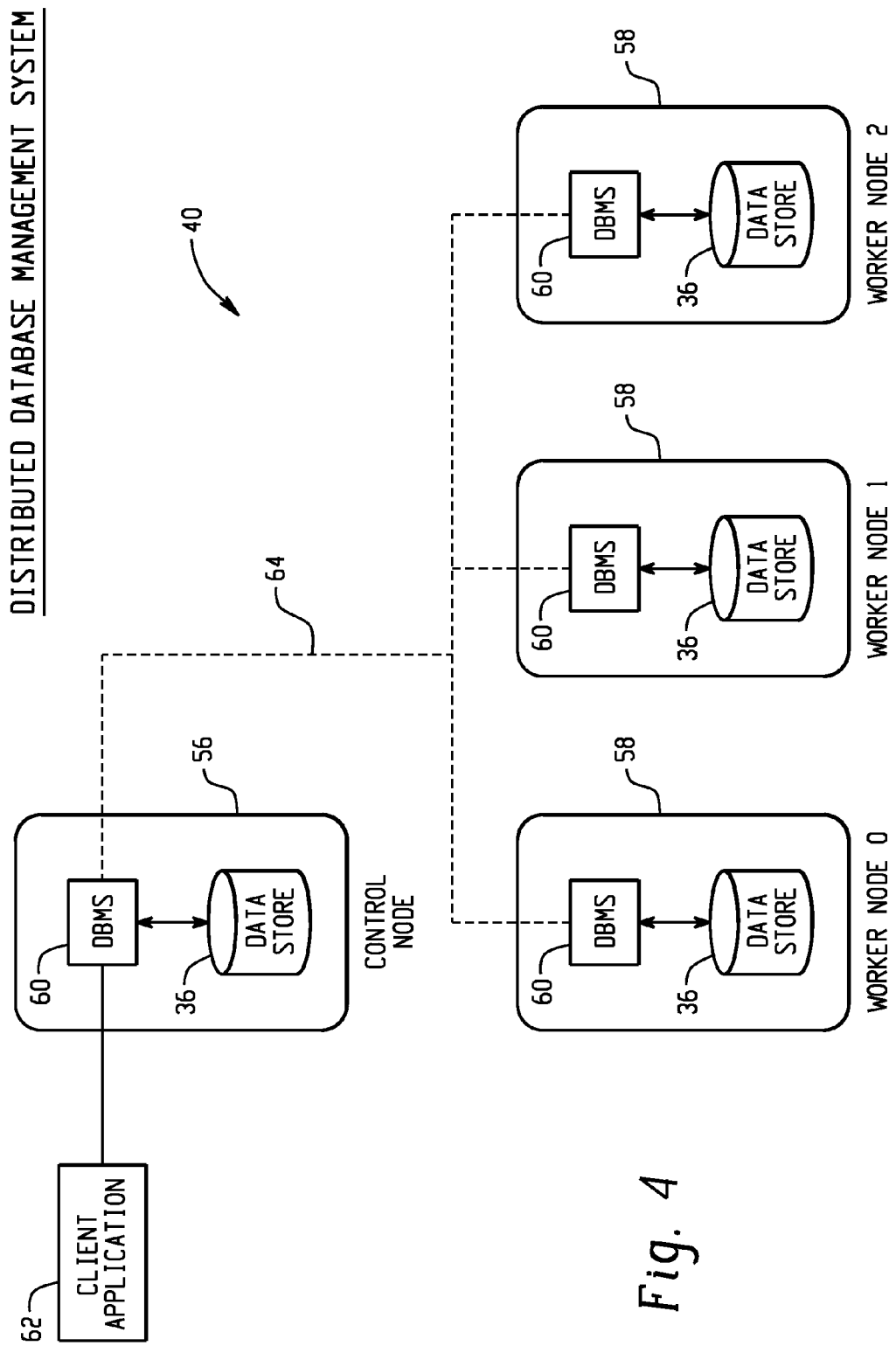
FIG. 4 is a block diagram depicting hardware and software components of a distributed database management system.

FIG. 4 illustrates hardware and software components for a distributed database management system 40. The distributed database management system 40 includes database management software (DBMS) 60 that executes on a database server at a control database node 56 and on a database server at each of a plurality of worker database nodes 58. Each database node 56, 58 includes a database server and one or more data stores 36 that are attached to the database server. The database server executes the database management software (DBMS) 60, which controls the creation, maintenance, and the use of a database (i.e., a data structure) that organizes data stored in the data stores 36. The DBMS at the control node 56 of the distributed database management system 40 communicates with a client application 62 to accept requests for data and to instruct the database management system to transfer the appropriate data. The DBMS 60 at each database node can communicate with each other via a network 64.

With the distributed database management system, collections of data are distributed across multiple physical locations. In this example, each database node 56, 58 in the distributed system stores in its associated data store 36 a portion of the total data managed by the DBMS. One process typically employed by the DBMS to protect against data loss is replication. Replication typically involves providing a backup copy of the data stored on one node on one or more other nodes. When replication is employed, if one node fails, then the data from the failed node can be recovered from a replicated copy residing at another node.

As illustrated in FIG. 4, each database node 56, 58 in the distributed database system has distinct data stores 36, such as disks or other memory devices, as well as distinct main memory. In distributed database systems where the data is kept current in all locations, distributed query processing can take place. This means that the DBMS at each node can process a query for data.

Figure 5:
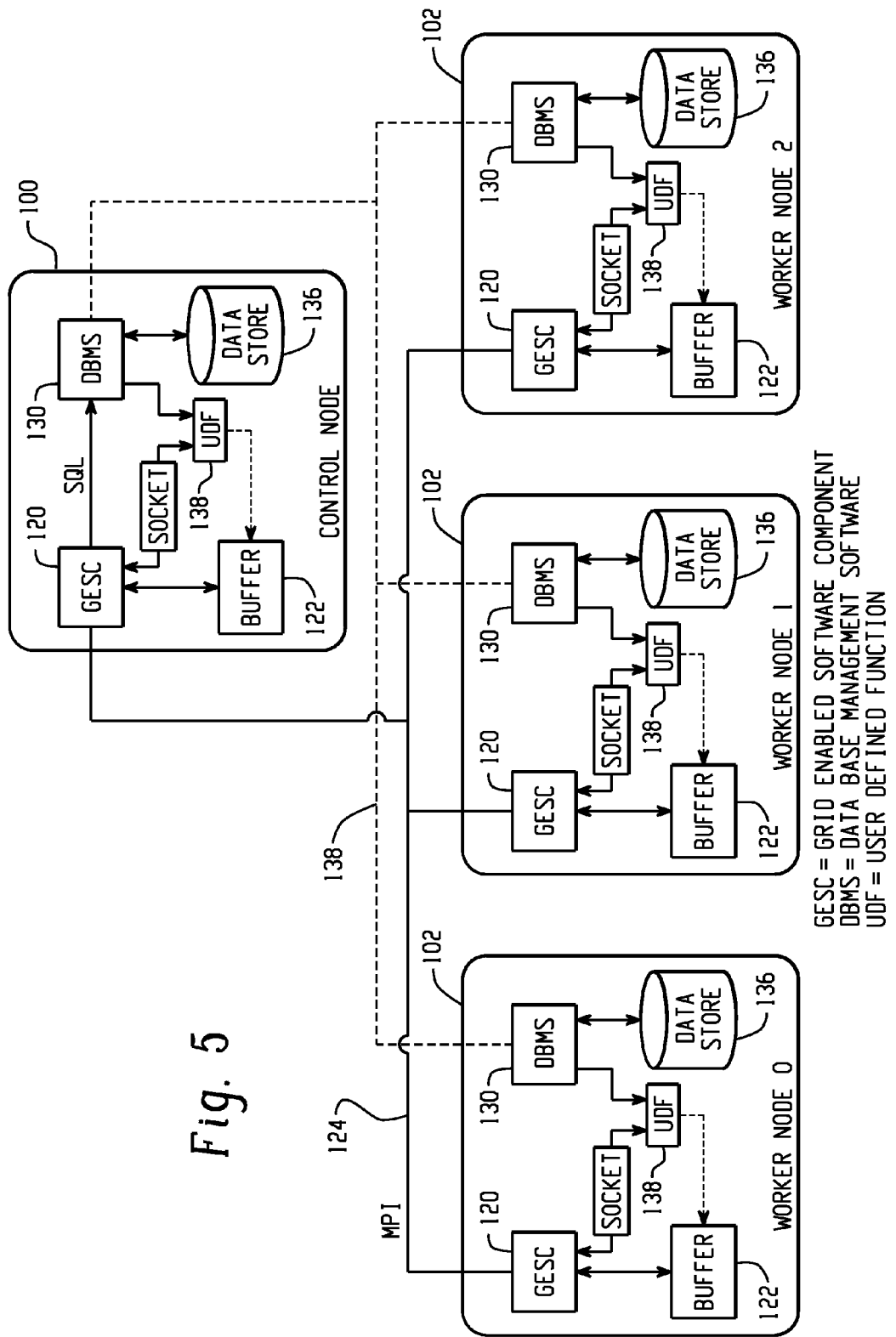
FIGS. 5 and 6 are block diagrams depicting hardware and software components of a grid-based computing system co-located with a distributed database system.

FIG. 5 depicts a grid-based computing system that is co-located with a distributed database management system. In this embodiment, each of a number of data processor nodes 100, 102 includes a data processor that can be shared by a distributed database management system and a grid-based computing system. Each data processing node includes a grid-enabled software component (GESC) 120, which has access to buffer memory 122, and database management software (DBMS) 130, which is connected to a data store 136. Each node can execute both the GESC 120 and the DBMS 130. The execution of the GESC 120 at various nodes allows for the operation of a grid-based computing environment for performing complex data analysis. Similarly, the execution of the DBMS 130 at the nodes allows for the operation of a distributed database management system for storing data to be used in the data analysis.

Similar to the distributed database management system illustrated in FIG. 4, the DBMS 130 at each node 100, 102 can communicate with DBMS at other nodes via a network 138, and similar to the grid-based computing system illustrated in FIG. 3, the GESC 120 at the various nodes 100, 102 are connected via a network 124 and can communicate with each other using a predetermined communication protocol such as the Message Passing Interface (MPI). Each GESC 120 can engage in point-to-point communication with the GESC at another node or in collective communication with multiple GESCs via the network 124. In the illustrated embodiment, the control node 100 has the same hardware configuration as the worker nodes 102.

In this example, the GESC 120 at each node contains identical software instructions. The GESC however has multiple execution modes. Because of the multiple execution modes each data processing node 100, 102 is capable of operating as a control node 100 or a worker node 102.

Provided with the DBMS 130 at each node is a user-defined function (UDF) 138. The UDF provides a mechanism for an application program to transfer data to or receive data from the database stored in the data stores 136 that are managed by the DBMS 130. For example, at the data processing nodes 100, 102, a UDF 138 can be invoked by the DBMS to provide data to the GESC. In the illustrated embodiment, the UDF 138 establishes a socket connection with the GESC to transfer data. Alternatively, as illustrated by the arrow with hash marks in FIG. 5, the UDF 138 can transfer data to the GESC by writing data to shared memory accessible by both the UDF and the GESC.

Figure 6:
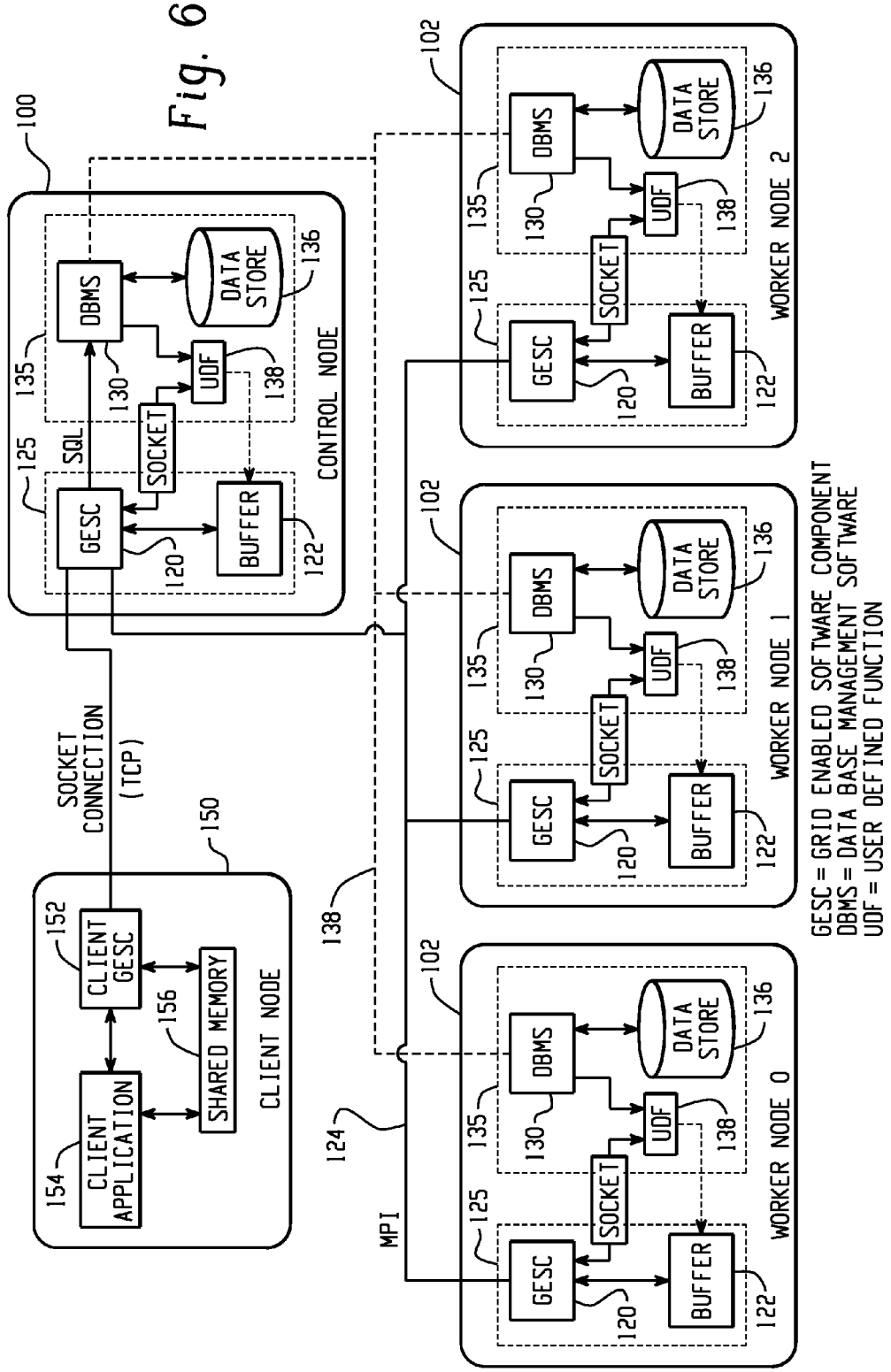

FIG. 6 illustrates an embodiment wherein a client application node 150 is communicatively coupled to the control node 100 of a grid-based computing system that is co-located with a distributed database management system. The client application node 150 includes a client GESC 152 and a client application 154 that execute on a shared data processor and memory 156. The illustrated client application 154 may request that data analysis be performed by the grid-based computing system. The illustrated client GESC 152 interfaces with the client application 154 to receive the request from the client application for data analysis and to provide the results of the data analysis to the client application.

In this example, the client GESC 152 contains software instructions that are identical to the software instructions of the GESC 120 at the control and worker nodes. The GESC at each of these nodes in this embodiment have an additional mode of operation, a client mode. In the client mode, the GESC 152 can communicate with the GESC 120 at the control node, for example over a socket connection such as a TCP connection, to instruct the grid-based computing environment to perform data analysis and to receive the results of the data analysis for provision to the requesting client application.

In another embodiment, the client GESC 152 can operate in a solo mode wherein the client GESC 152 can perform the requested data analysis without the use of the grid-based computing environment. In this embodiment, the client application 154 indicates to the client GESC 152 whether the requested data analysis should be performed using the grid-based computing environment or in the solo mode at the client application node.

As illustrated in FIG. 6, the component of the grid-based computing system residing at each processing node 100, 102, shown as grid-based computing system component 125, may be implemented as a virtual machine operating on the data processor located at that node. Also or alternatively, the component of the distributed database management system residing at each processing node 100, 102, shown as distributed database component 135, may be implemented as a virtual machine operating on the data processor located at that node. Operating one or both of the components 125, 135 as a virtual machine allow for the sharing of the underlying physical machine resources provided by the data processor located at that node while maintaining strong isolation between the grid-based computing system component 125 and the distributed database component 135. Alternatively, the grid-based computing system component 125 and the distributed database component 135 could be operated as a common virtual machine providing isolation for those components 125, 135 from other processes that may share the underlying physical machine resources. Thus, a grid-based computing system that is co-located with a distributed database management system could operate under any of the following configurations: (i) a configuration where virtual machines are not employed with respect to grid-based computing system component 125 or distributed database component 135; (ii) a configuration where a virtual machine is employed for grid-based computing system component 125 but not for distributed database component 135; (iii) a configuration where a virtual machine is employed for distributed database component 135 but not for grid-based computing system component 125; (iv) a configuration where separate virtual machines are employed for each of grid-based computing system component 125 and distributed database component 135; and (v) a configuration where a common virtual machine is employed for both grid-based computing system component 125 and distributed database component 135.

Figure 7:
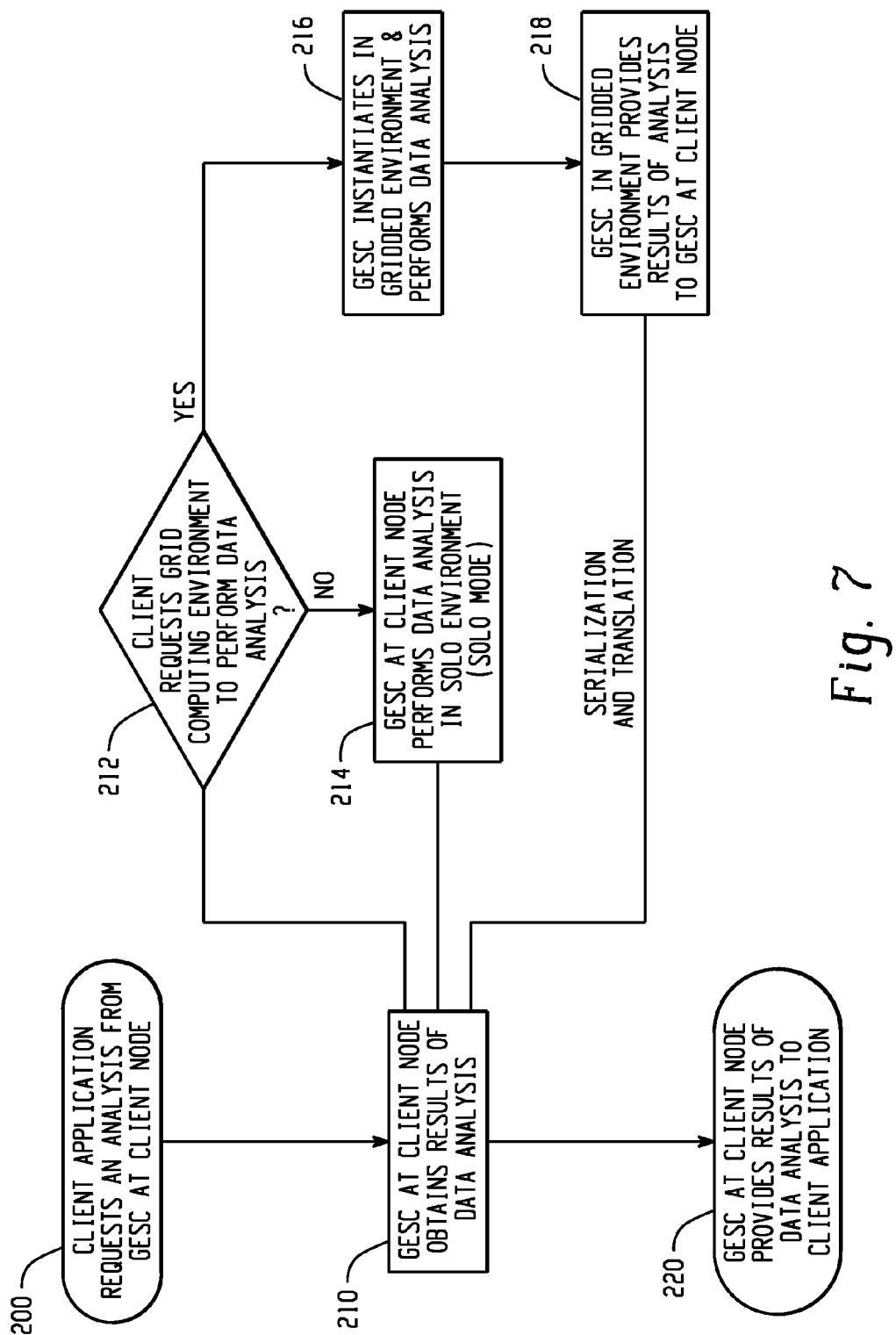
FIGS. 7-11 are process flow diagrams depicting a process flow of a grid-based computing system for analyzing data in either a grid-based or solo environment.

FIG. 7 illustrates an example process for performing data analysis. The GESC at the client node communicates with a client application at the client node to receive ad hoc queries from a user and to respond to those ad hoc queries after large amounts of data have been processed. As illustrated at step 200, the client application presents an ad hoc query to the client GESC that requires that an analysis of data be performed. The ad hoc query can contain instructions on the type of data analysis to be performed and whether the analysis should be performed using the grid-based computing environment. At step 210, the client GESC initiates the requested data analysis and obtains the results of the data analysis. At step 220, the client GESC provides the results of the analysis to the client application.

In the illustrated embodiment, initiating the requested data analysis and obtaining the results (step 210) requires the performance of a number of steps. As shown, at step 212, the client GESC determines if the ad hoc query requires the use of the grid-based computing environment to perform the data analysis. If the answer to that determination is no, then the client GESC at step 214 performs the data analysis at the client node. If the answer to the determination made at step 212 is yes, then the client GESC at step 216 causes the GESC to be instantiated in the grid-based computing environment and causes the grid-based computing system to perform the data analysis. This determination may also involve determining the configuration of the grid-based computing environment. For example, this determination may include the number of worker nodes and the number of threads per worker node to be employed when performing the data analysis. At step 218, the GESC in the grid-based computing environment provides the results of the analysis to the client GESC.

The provision of the results from the grid-based computing environment to the client node may require translation of data because of differences between the operating system in the grid-based computing environment and the operating system that executes on the client node. For example, the data processor that executes the control node GESC may have a 64-bit Linux operating system, and the data processor that executes the client GESC may have a 32-bit operating system, such as a 32-bit Windows PC operating system. The representation of wide-char characters is different in the two operating systems and the characters in the Linux format must be translated into the proper representation on the Windows client.

Figure 8:
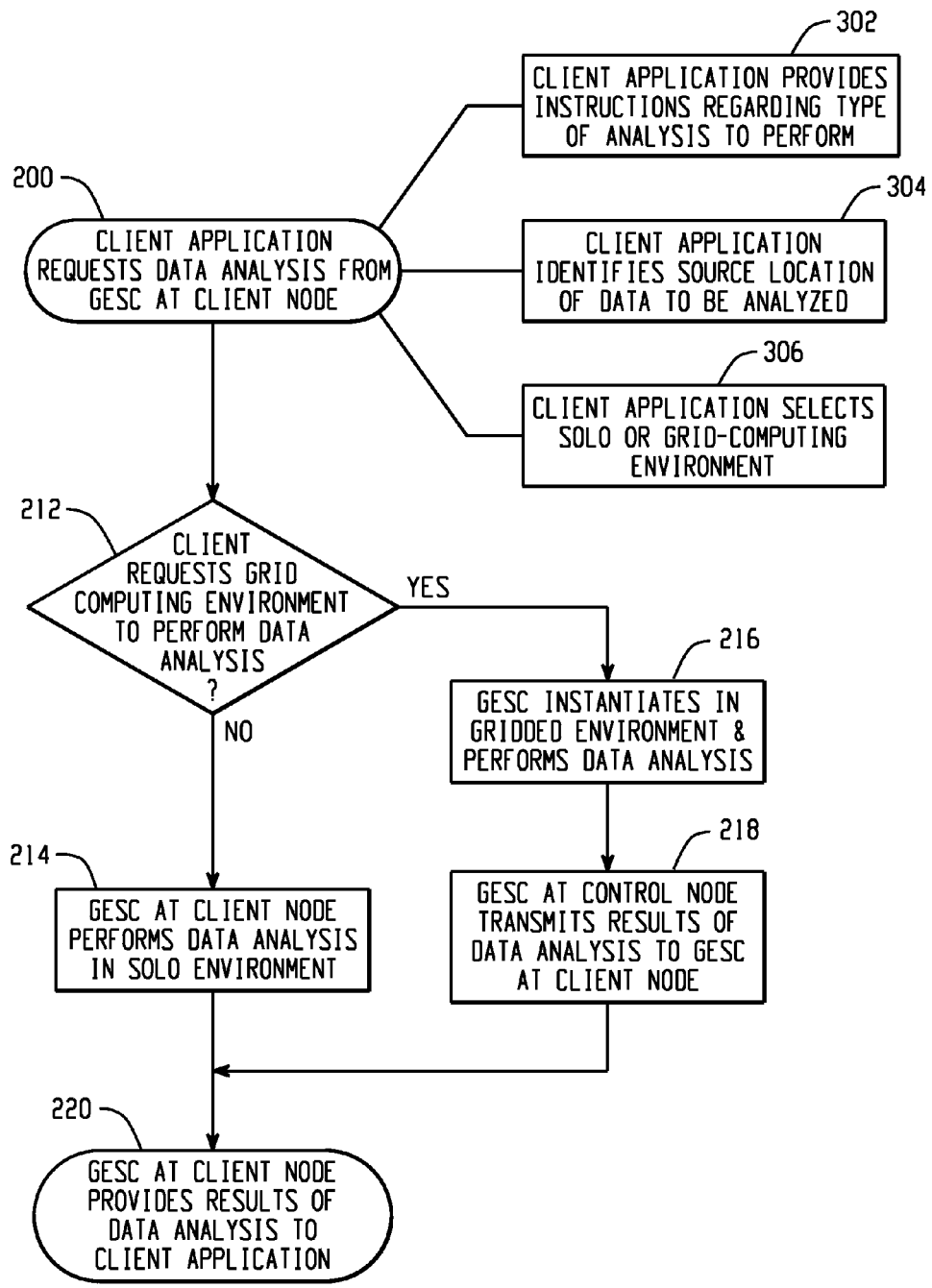

In the embodiment illustrated at FIG. 8, example elements are provided for illustrating components of an ad hoc query from a client application to the client GESC. Depicted at 302, the client application provides instructions on the type of data analysis to perform. Depicted at 304, the client application identifies the source location of data to be used in the data analysis. The data to be used in the data analysis in this example is stored in the distributed database system that is co-located with the grid-based computing environment. Finally, at 306, the client application instructs whether the solo or grid-based computing environment is to be utilized to perform the requested data analysis.

Figure 9:
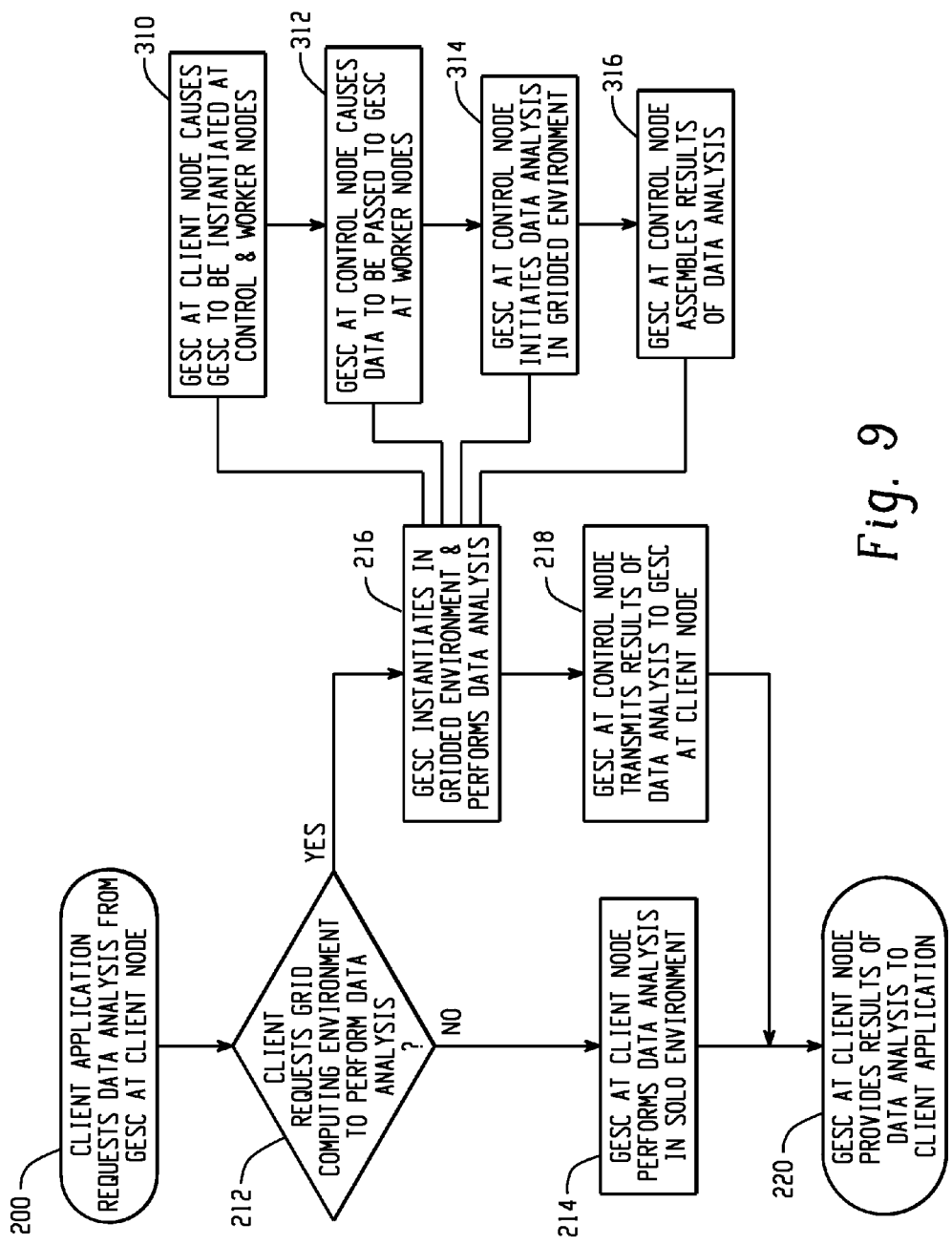

In the embodiment illustrated at FIG. 9, example steps are provided for instantiating the GESC in the grid-based computing environment to perform the requested data analysis. At step 310 the client node GESC causes the GESC to be instantiated at the control node and a plurality of worker nodes. At step 312, the control node GESC causes the data to be used in the analysis to be passed to the GESC at the worker nodes. At step 314, the GESC at the control node initiates the data analysis in the grid-based computing environment. Finally, at step 316, the GESC at the control node assembles the results from analysis performed by the GESC at the various worker nodes.

Figure 10:
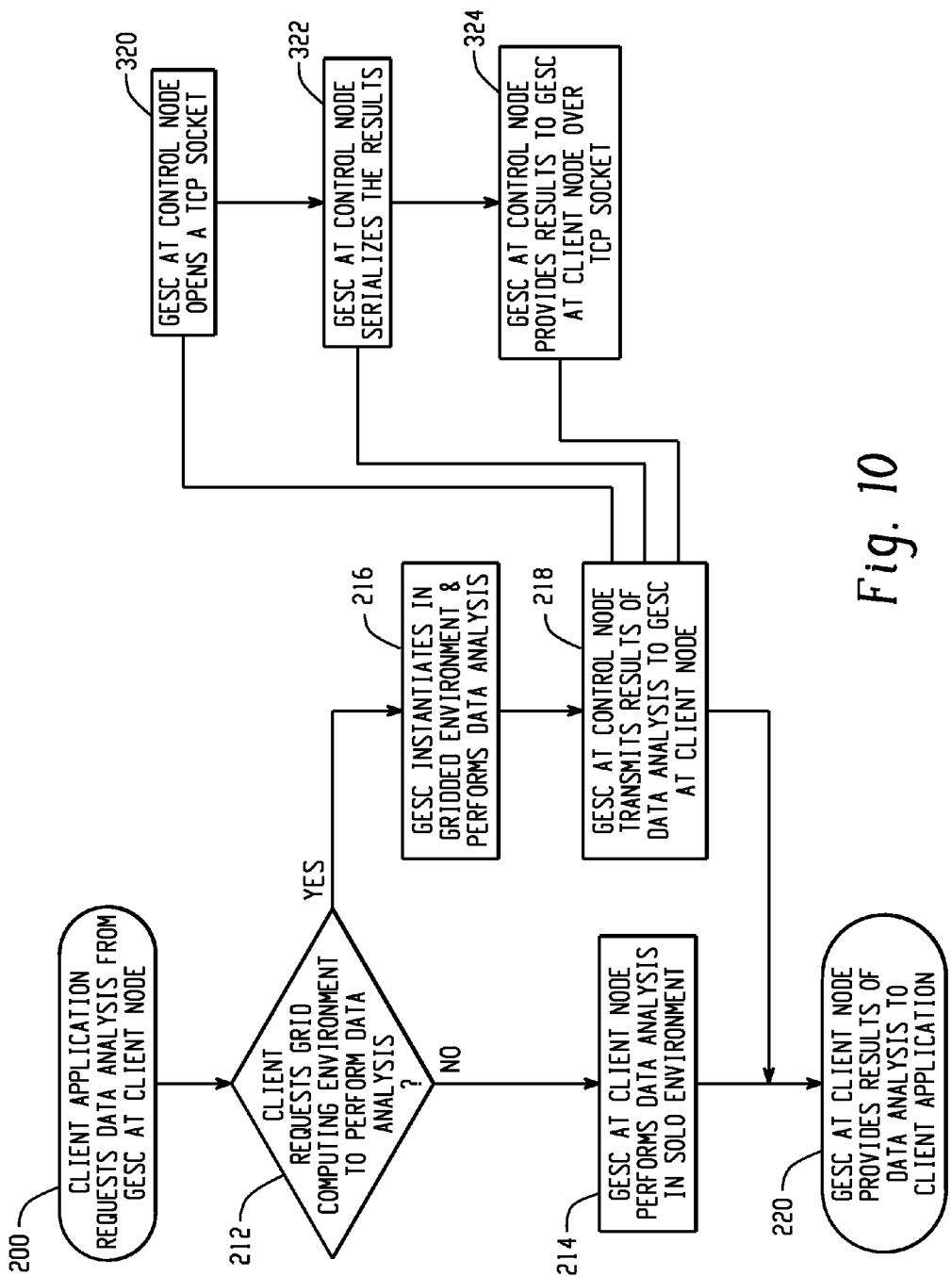

In the embodiment depicted at FIG. 10, example steps are provided to illustrate a method for use by the control node GESC in providing the results of the data analysis to the client node GESC. At step 320 the control node GESC opens a TCP socket connection. At step 322, the control node GESC serializes the results of the data analysis. At step 324, the control node provides the serialized results of the data analysis to the client node GESC over the TCP socket.

Figure 11:
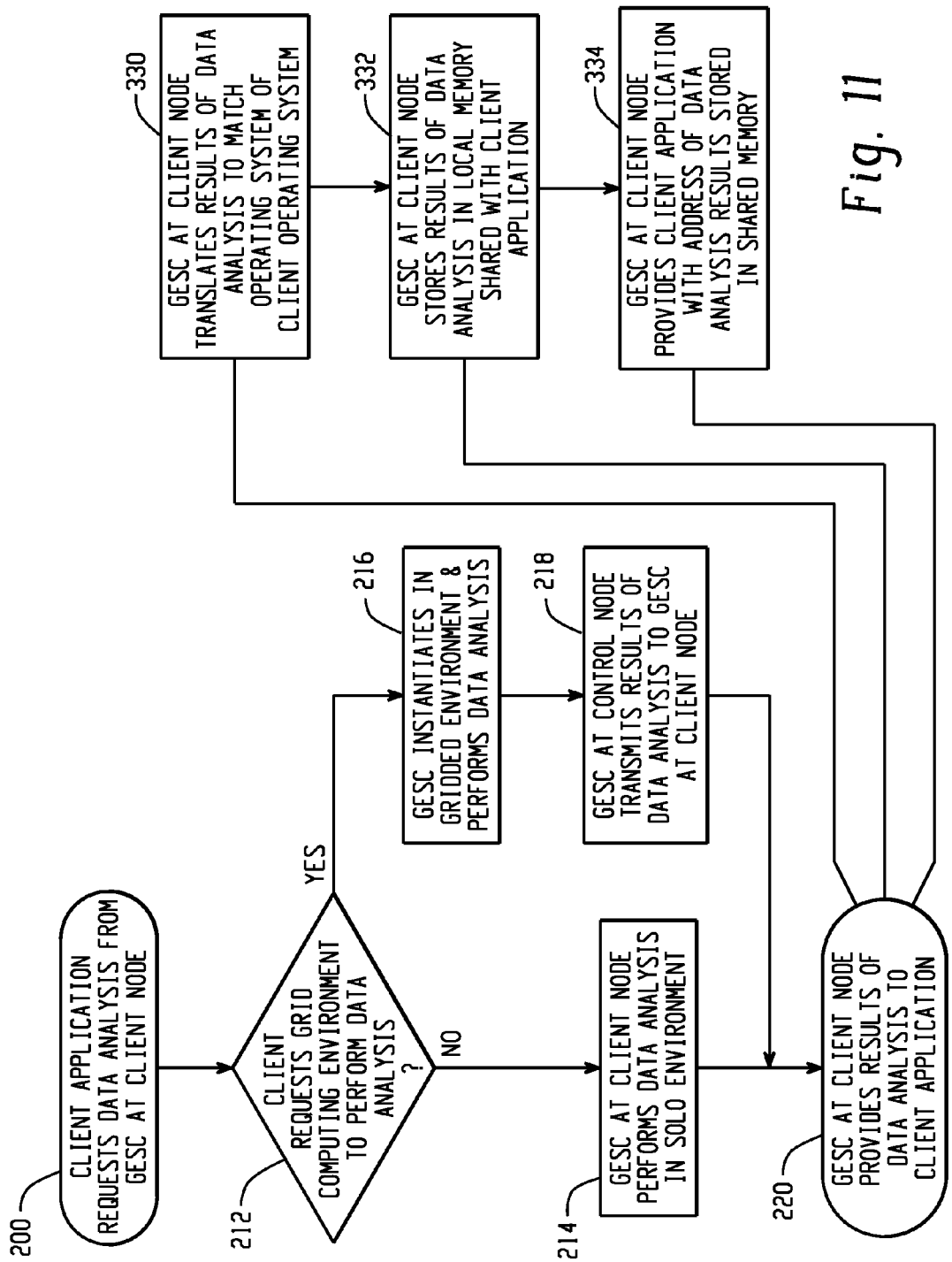

In the embodiment depicted at FIG. 11, example steps are provided for use by the client node GESC in providing the results of the data analysis to the requesting client application. At step 330, the client node GESC translates the serialized data analysis results received from the control node GESC into a format that can be recognized by the operating system of the client application. At step 332, the client node GESC stores the translated data analysis results in local memory shared between the client node GESC and the client application. Finally, at step 334, the client node GESC provides the client application with the address, in the shared memory, of the translated data analysis results.

Figure 12:
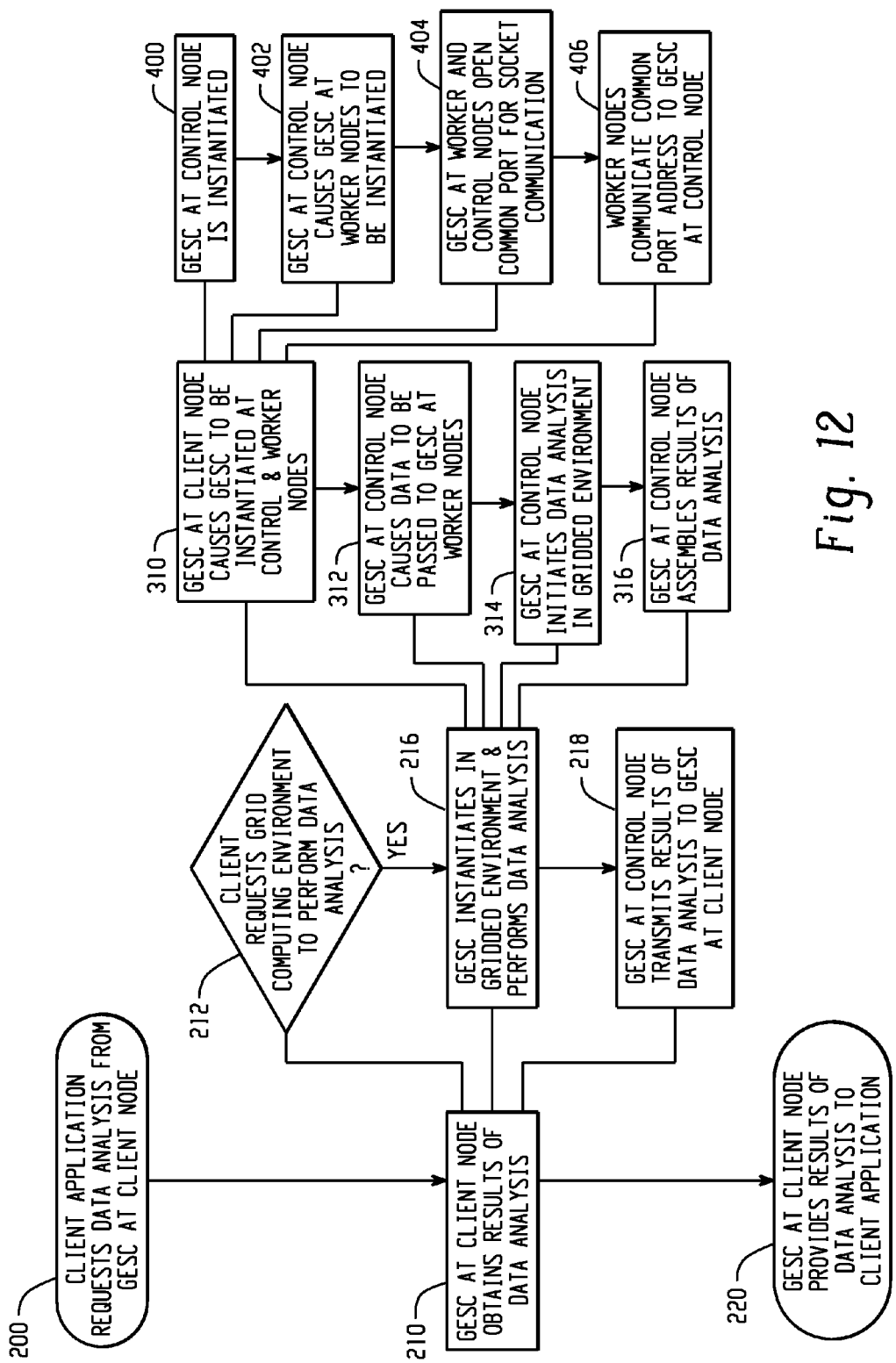
FIGS. 12-16 are process flow diagrams depicting a process flow of software components for performing data analysis in a grid-based computing environment.

In the embodiment depicted at FIG. 12, example steps are provided to illustrate a method for the instantiation of the GESC in the grid-based computing environment. At step 400, the GESC at the control node is instantiated. At step 402, based on the number of potential worker nodes available and the number of worker nodes desired to perform the data analysis, the control node GESC causes the GESC at worker nodes to be instantiated. At step 404, the GESC at the worker and control nodes attempt to open a common port for socket communication. Finally, at step 406, the common port address from the worker nodes is communicated to the control node GESC, which also opens a port at the same address for socket communication.

Figure 13:
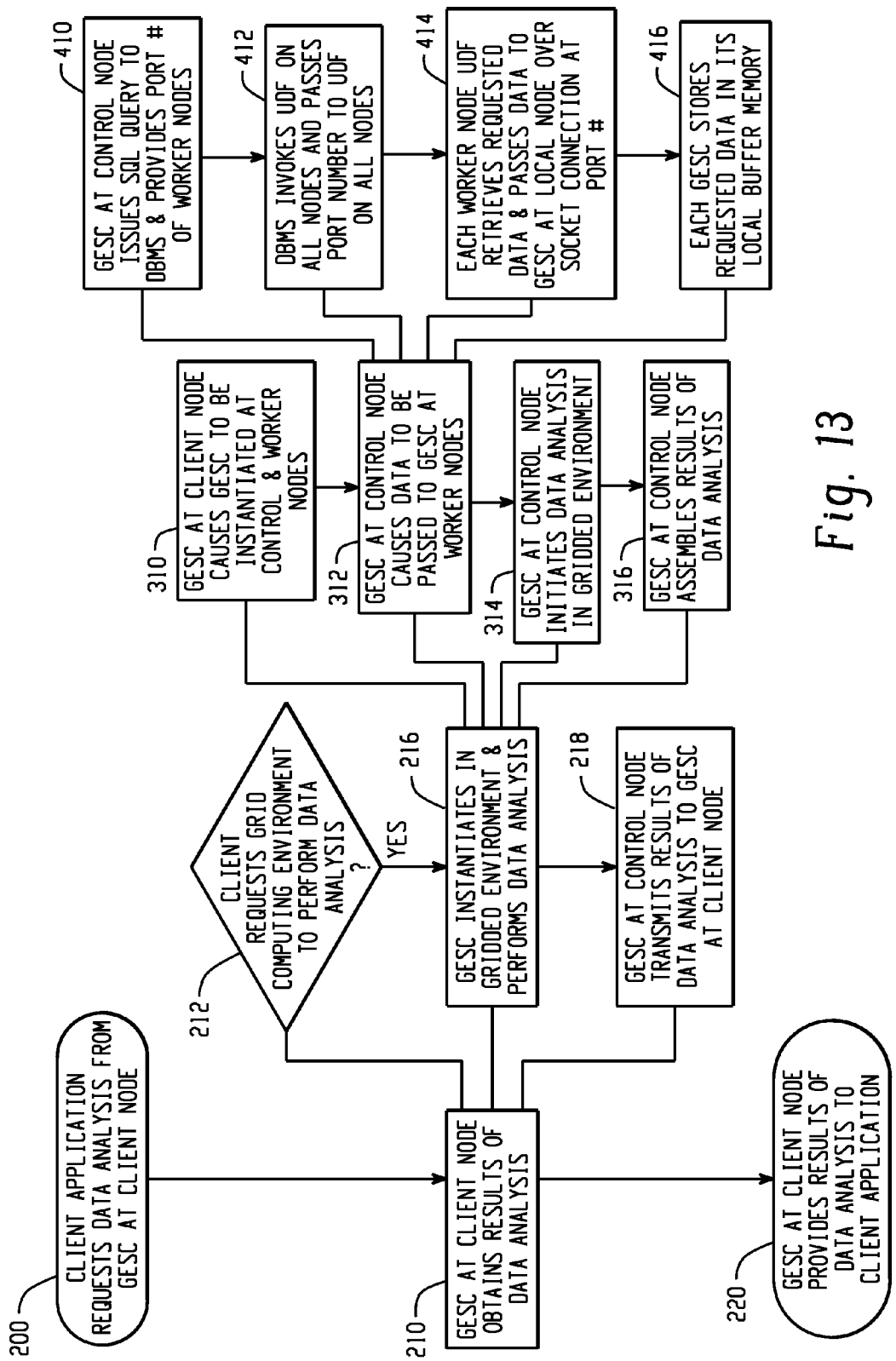

Depicted in FIG. 13 are example steps illustrating a method for the control node GESC to use to cause the data that is to be used in the analysis to be provided to the worker node GESCs. At step 410 the control node GESC issues an SQL query to the DBMS at the control node and provides the common port number of the worker node socket ports. At step 412 the control node DBMS invokes a user-defined function (UDF) on all nodes and passes the port number to the UDF on all nodes. At step 414, each worker node UDF retrieves the data to be used in the data analysis and passes the data to the GESC at its local node over a socket connection at the provided port address. In this example, each worker node GESC receives a portion of the overall set of data to be used in the data analysis. Alternatively, each or some of the worker node GESCs could receive the complete set of data to be used in the analysis. At step 416, the worker node GESCs store the received data in their local buffer memory. As an alternative to steps 414 and 416, each UDF could retrieve the data to be used in the data analysis and pass the data to the GESC at its local node by storing the data in common memory accessible by both the UDF and the GESC. The GESC could then either process the data from the shared memory or move the data to dedicated memory for processing.

Figure 14:
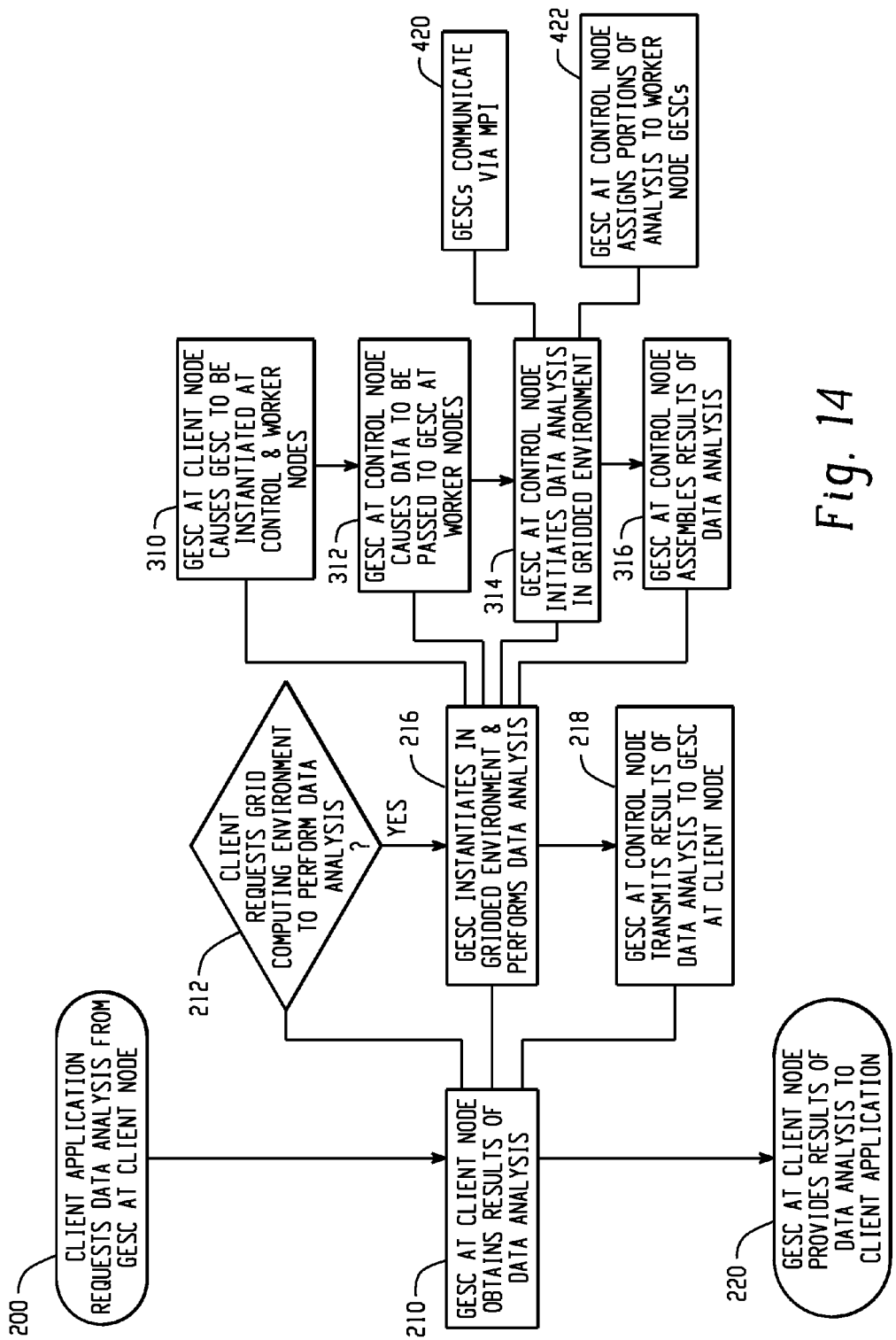

Illustrated at FIG. 14 are example steps that may be implemented when initiating data analysis in the grid-based computing environment. At step 420, the control node GESC communicates with the worker node GESCs over a communication network using the Messaging Passing Interface (MPI). At step 422, the control node GESC assigns a portion of the analysis to worker node GESCs. In this example, all of the worker node GESCs perform the same analytical calculations, but on different portions of the overall set of data to be used in the analysis. Alternatively, the control node GESC could instruct a plurality of worker node GESCs to perform different analytical steps.

Figure 15:
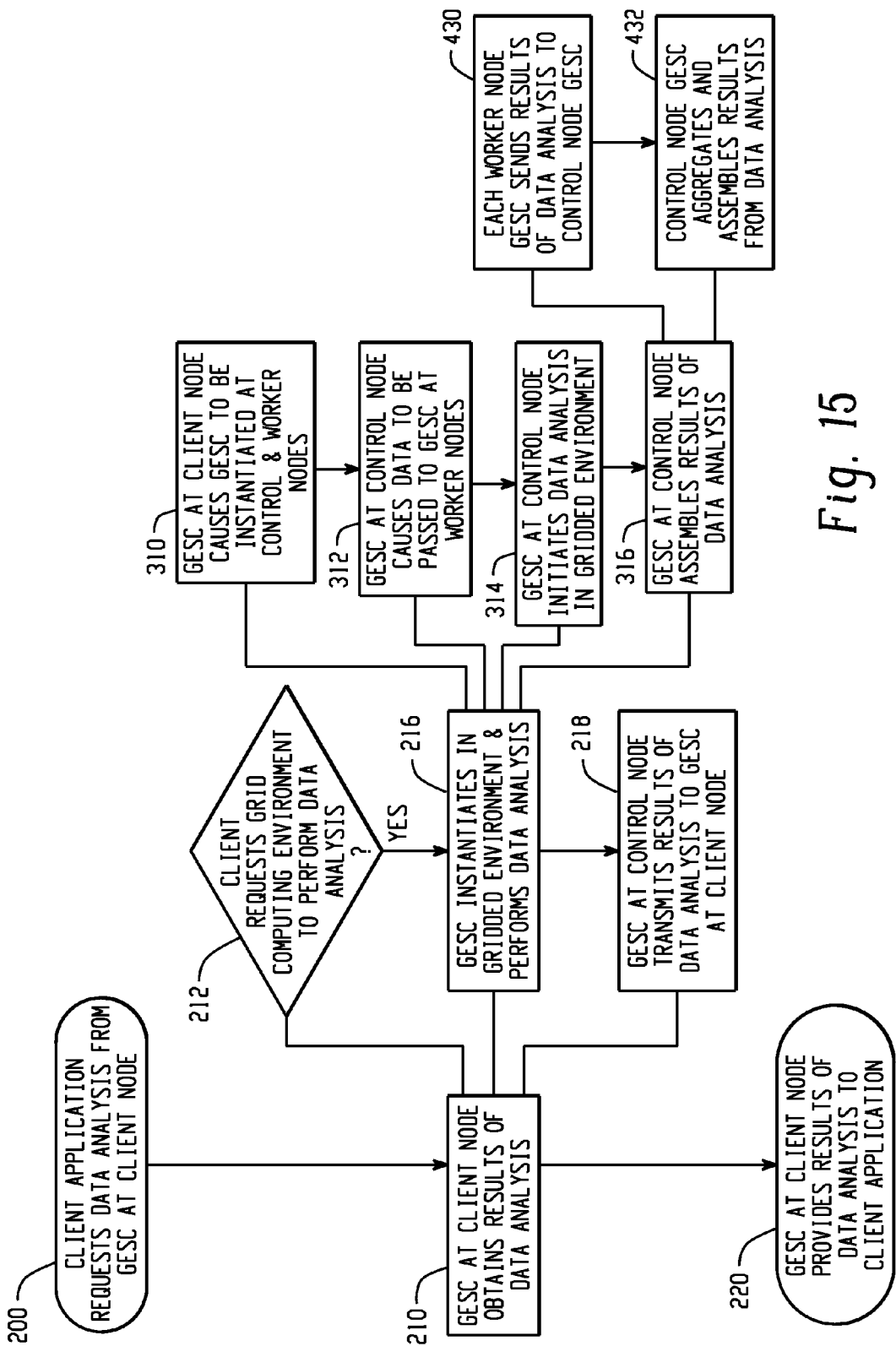

Illustrated at FIG. 15 are example steps for assembling the data analysis results at the control node. At step 430, the worker-node GESCs send the results from their analytical calculations to the control node GESC. One way the results generated by the worker-node GESCs can be transmitted to the control node GESC is via MPI. Another way the results could be transmitted is by the worker node GESCs storing their data analysis results in the distributed database and providing the location of the results in the distributed database to the control node GESC via MPI. At step 432, the control node GESC aggregates and assembles the results from the analytical calculations performed by the worker node GESCs. The results could be stored in local memory or in the distributed database. The control node GESC may also perform at 432 additional mathematical operations (e.g., descriptive statistical calculations) on the aggregated data before final assembly of the results.

In case of a node failure while calculations are underway, the control node GESC can reinitiate data analysis in the grid-based computing environment without having to redistribute the data to be used in the data analysis. Because the various worker nodes GESCs are co-located at nodes with DBMS, the distributed database management system protection mechanisms can protect against data loss during a node failure. The local DBMS has access to a replicate copy of the data to be used in the data analysis and provides the data to the various worker node GESCs. When recalculations are necessary due to a node failure, the control node GESC can reassign the portion of the analysis previously assigned to the failed node to the GESC at one or more of the remaining worker nodes (or a new worker node). This may involve instructing one or more worker node GESCs to perform their analytical calculation on additional data.

Figure 16:
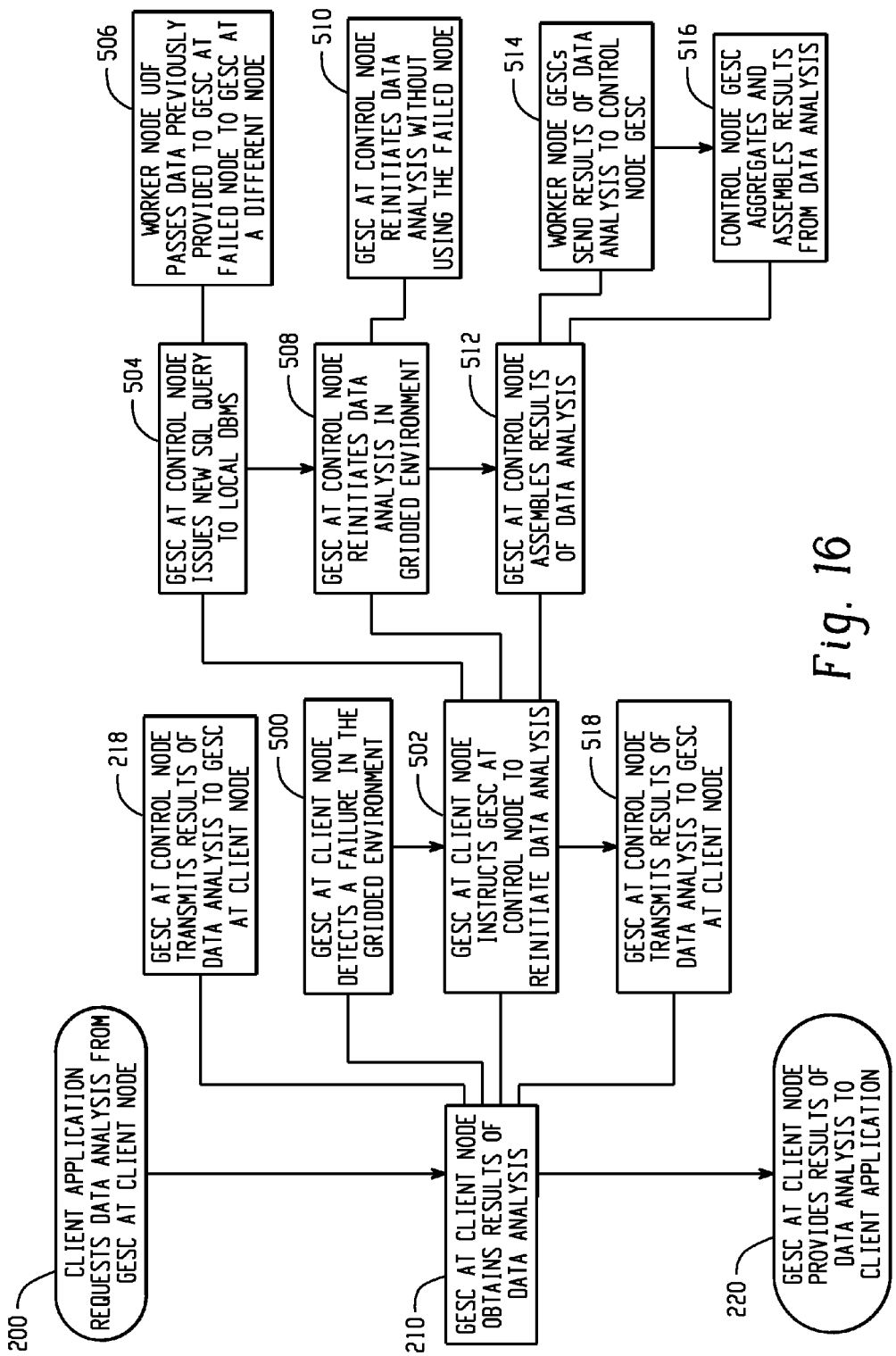

Depicted at FIG. 16 are example steps for recovery from a node failure. The client node GESC detects a failure in the grid-based computing environment (step 500). At step 502, the client node GESC instructs the control node GESC to reinitiate the data analysis. At step 504, the control node GESC issues a new SQL query to the control node DBMS. If there is a failed node, the DBMS causes the data that resided on the failed node to be replaced by its replicate copy that resides on one or more non-failed nodes. The data previously provided to the GESC at the failed node is provided by a worker UDF to the GESC at a different node (step 506). This may result in the GESC at one of the nodes being provided with the data originally provided to it plus the data originally provided to the GESC at the failed node. Alternatively, it may result in the GESC at a new node being provided with the data originally provided to the GESC at the failed node. At step 508, the GESC at the control node reinitiates data analysis. This involves, at step 510, the control node GESC reinitiating the data analysis without the failed node. At step 514, the worker node GESCs send the results from their analytical calculations to the control node GESC. At step 516, the control node GESC aggregates and reassembles the results from the data analysis. At step 518, the control node GESC transmits the results of the data analysis to the client node GESC.

Depicted in FIG. 2 is a multi-user environment involving the grid-based computing environment. In such an environment, each user 32 will receive its own client GESC to handle its queries and to communicate with a selected control node GESC.

This written description uses examples to disclose the invention, including the best mode, and also to enable a person skilled in the art to make and use the invention. The patentable scope of the invention may include other examples.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A grid computing system for performing analytical calculations on data stored in a distributed database system, the grid computing system comprising:
    a plurality of grid computing nodes including a control node and a plurality of worker nodes, each node comprising:
        a processor for executing database management software (DBMS) and for executing a grid-enabled software component,
        local buffer memory accessible by the grid-enabled software component, and
        local storage media accessible to the DBMS for storing data;
        wherein the grid-enabled software component is configured to perform the analytical calculations on a portion of the data stored by the database management system;
    the grid-enabled software component at the control node being configured to:
        invoke the DBMS at the control node to cause the DBMS at a plurality of the worker nodes to make available a portion of the data to the grid-enabled software component local to its node;
        instruct the grid-enabled software components at the plurality of worker nodes to perform an analytical calculation on the received data and to send the results of the data analysis to the grid-enabled software component at the control node; and
        assemble the results of the data analysis performed by the grid-enabled software components at the plurality of worker nodes.

2. The system according to claim 1 wherein the DBMS at a plurality of worker nodes are configured to make the data available to their local grid-enabled software component by saving the data to shared memory locally accessible by both the DBMS and the grid-enabled software component.

3. The system according to claim 1 wherein the DBMS at the plurality of worker nodes are configured to make the data available to their local grid-enabled software component by communicating over a socket connection.

4. The system according to claim 3 wherein the grid-enabled software components at the plurality of worker nodes are configured to open socket connections using a common port address.

5. The system according to claim 4 wherein the grid-enabled software component at the control node is configured to provide the common port address to the DBMS local to its node and the DBMS at the control node is configured to provide the common port address to the DBMS at the plurality of worker nodes.

6. The system according to claim 1 wherein the grid-enabled software components at the plurality of worker nodes are configured to store the received data and perform the data analysis using their local buffer memory.

7. The system according to claim 1 wherein the plurality of worker nodes are configured to transmit the results from the data analysis to their local DBMS for storage in the distributed database.

8. The system according to claim 1 wherein the results of the analysis received from the plurality of worker node grid-enabled software components are received via a network.

9. The system according to claim 8 wherein a plurality of the worker node grid-enabled software components transmit their results using MPI over the network.

10. The system according to claim 1 wherein the results assembled by the control node grid-enabled software component are stored in the distributed database system.

11. The system according to claim 1 wherein the results assembled by the control node grid-enabled software component are transmitted to a grid-enabled software component at a client node.

12. The system according to claim 1 wherein upon the detection of a failure at one of the worker nodes:
    the DBMS at the control node is configured to cause the DBMS at one of the remaining worker nodes to redistribute the portion of the data previously distributed to the grid-enabled software component at the failed node to the grid-enabled software component local to that node;
    the grid-enabled software component receiving the redistributed data is configured to perform an analytical calculation on the redistributed data and provide the results to the grid-enabled software component at the control node; and
    the grid-enabled software component at the control node is configured to assemble the results received from the grid-enabled software components at the remaining worker nodes.

13. The system according to claim 1, further comprising a grid-enabled software component at a client node:
    the grid-enabled software component at the client mode being configured with a first executing mode and a second executing mode;

the client node grid-enabled software component in the first executing mode being configured to perform local data analysis for provision of the results to the client software;

the client node grid-enabled software component in the second executing mode being configured to invoke the grid-enabled software component at the control node to perform the data analysis in a grid-based computing environment; and the grid-enabled software component at the client node being configured to operate in the first mode or the second mode based on an indication provided by the client software.

14. The system according to claim 13 wherein the client node grid-enabled software component is configured to receive ad hoc questions from a client application and to provide responses to the ad hoc questions by providing the results assembled by the control node grid-enabled software component to the client application.

15. The system according to claim 1, further comprising a client-node grid-enabled software component that is configured to receive ad hoc questions from a client application and to provide responses to the ad hoc questions by providing the results assembled by the control node grid-enabled software component to the client application.

16. The system of claim 1, wherein the grid-enabled software component at the control node is configured to assemble the results by aggregating and concatenating the results of the analysis performed at the worker node data processors.

17. The system of claim 1, wherein the grid-enabled software component at a plurality of the grid computing nodes is implemented in a virtual machine environment at each node.

18. The system of claim 1, wherein the database management software at a plurality of the grid computing nodes is implemented in a virtual machine environment at each node.

19. The system of claim 18, wherein the grid-enabled software component at the plurality of the grid computing nodes is implemented in a separate virtual machine environment at each node.

20. The system of claim 18, wherein the grid-enabled software component at the plurality of the grid computing nodes is implemented in a common virtual machine environment with the database management software at each node.

21. A method in a grid computing system for performing analytical calculations on data stored in a distributed database system, the method comprising:

providing a plurality of grid computing nodes including a control node and a plurality of worker nodes, each node comprising a processor for executing database management software (DBMS) and for executing a grid-enabled software component, local buffer memory accessible by the grid-enabled software component, and local storage media accessible to the DBMS for storing data;

invoking the DBMS at the control node to cause the DBMS at a plurality of the worker nodes to make available a portion of the data to the grid-enabled software component local to its node;

instructing the grid-enabled software components at the plurality of worker nodes to perform an analytical calculation on the received data and to send the results of the data analysis to the grid-enabled software component at the control node; and assembling the results of the data analysis performed by the grid-enabled software components at the plurality of worker nodes.

22. The method according to claim 21 wherein the DBMS at a plurality of worker nodes are configured to make the data available to their local grid-enabled software component by saving the data to shared memory locally accessible by both the DBMS and the grid-enabled software component.

23. The method according to claim 21 wherein the DBMS at the plurality of worker nodes are configured to make the data available to their local grid-enabled software component by communicating over a socket connection.

24. The method according to claim 23 wherein the grid-enabled software components at the plurality of worker nodes are configured to open socket connections using a common port address.

25. The method according to claim 24 wherein the grid-enabled software component at the control node is configured to provide the common port address to the DBMS local to its node and the DBMS at the control node is configured to provide the common port address to the DBMS at the plurality of worker nodes.

26. The method according to claim 21 wherein the grid-enabled software components at the plurality of worker nodes are configured to store the received data and perform the data analysis using their local buffer memory.

27. The method according to claim 21 wherein the plurality of worker nodes are configured to transmit the results from the data analysis to their local DBMS for storage in the distributed database.

28. The method according to claim 21 wherein the results of the analysis received from the plurality of worker node grid-enabled software components are received via a network.

29. The method according to claim 28 wherein a plurality of the worker node grid-enabled software components transmit their results using MPI over the network.

30. The method according to claim 21 further comprising storing the results assembled by the control node grid-enabled software component in the distributed database system.

31. The method according to claim 21 further comprising transmitting the results assembled by the control node grid-enabled software component to a grid-enabled software component at a client node.

32. The method according to claim 21 wherein upon the detection of a failure at one of the worker nodes:

the DBMS at the control node is configured to cause the DBMS at one of the remaining worker nodes to redistribute the portion of the data previously distributed to the grid-enabled software component at the failed node to the grid-enabled software component local to that node;

the grid-enabled software component receiving the redistributed data is configured to perform an analytical calculation on the redistributed data and provide the results to the grid-enabled software component at the control node; and the grid-enabled software component at the control node is configured to assemble the results received from the grid-enabled software components at the remaining worker nodes.

33. The method according to claim 21, further comprising the step of providing a grid-enabled software component at a client node wherein:

the grid-enabled software component at the client mode is configured with a first executing mode and a second executing mode;

the client node grid-enabled software component in the first executing mode is configured to perform local data analysis for provision of the results to the client software;

the client node grid-enabled software component in the second executing mode is configured to invoke the grid-enabled software component at the control node to perform the data analysis in a grid-based computing environment; and the grid-enabled software component at the client node is configured to operate in the first mode or the second mode based on an indication provided by the client software.

34. The method according to claim 33 wherein the client node grid-enabled software component is configured to receive ad hoc questions from a client application and to provide responses to the ad hoc questions by providing the results assembled by the control node grid-enabled software component to the client application.

35. The method according to claim 21, further comprising providing a client-node grid-enabled software component that is configured to receive ad hoc questions from a client application and to provide responses to the ad hoc questions by providing the results assembled by the control node grid-enabled software component to the client application.

36. The method of claim 21, wherein the assembling step comprises aggregating and concatenating the results of the analysis performed at the worker node data processors.

* * * * *